(12) United States Patent
Aggarwal et al.

(10) Patent No.: US 11,036,285 B2
(45) Date of Patent: Jun. 15, 2021

(54) SYSTEMS AND METHODS FOR MIXED REALITY INTERACTIONS WITH AVATAR

(71) Applicants: Abhinav Aggarwal, Mumbai (IN); Raghav Aggarwal, Mumbai (IN)

(72) Inventors: Abhinav Aggarwal, Mumbai (IN); Raghav Aggarwal, Mumbai (IN)

(*) Notice: Subject to any disclaimer, the term of this patent is extended or adjusted under 35 U.S.C. 154(b) by 0 days.

(21) Appl. No.: 16/635,559

(22) PCT Filed: Aug. 29, 2018

(86) PCT No.: PCT/IB2018/056593
§ 371 (c)(1),
(2) Date: Jan. 31, 2020

(87) PCT Pub. No.: WO2019/043597
PCT Pub. Date: Mar. 7, 2019

(65) Prior Publication Data
US 2020/0166991 A1 May 28, 2020

(30) Foreign Application Priority Data
Sep. 4, 2017 (IN) .............................. 201721031285

(51) Int. Cl.
*G06F 3/01* (2006.01)
*G06F 3/16* (2006.01)
(Continued)

(52) U.S. Cl.
CPC .............. *G06F 3/011* (2013.01); *G06F 3/017* (2013.01); *G06F 3/167* (2013.01);
(Continued)

(58) Field of Classification Search
CPC ........................................................ G06F 3/01
(Continued)

(56) References Cited

U.S. PATENT DOCUMENTS 6,724,919 B1* 4/2004 Akiyama ................. G07C 9/37
382/118
6,948,131 B1* 9/2005 Neven ................. H04L 12/1813
348/E7.083

(Continued)

OTHER PUBLICATIONS

Article 34 Amendment, Response to Written Opinion, PCT Application No. PCT/IB2018/056593 International filing date Aug. 29, 2019, Applicant Aggarwal, Abhinav. Article 34 Amendment dated Jun. 25, 2019, pp. 1-37 and 92-104.

(Continued)

*Primary Examiner* — David T Welch
(74) *Attorney, Agent, or Firm* — Patent Law Works, LLP

(57) ABSTRACT

A method (200) for mixed reality interactions with avatar, comprises steps of receiving (210) one or more of an audio input through a microphone (104) and a visual input through a camera (106), displaying (220) one or more avatars (110) that interact with a user through one or more of an audio outputted from one or more speakers (112) and a video outputted from a display device (108) and receiving (230) one or more of a further audio input through the microphone (104) and a further visual input through the camera (106). Further, a system (600) for mixed reality interactions with avatar has also been provided.

20 Claims, 13 Drawing Sheets

(51) Int. Cl.
  *G06K 9/00* (2006.01)
  *G06T 13/40* (2011.01)
(52) U.S. Cl.
  CPC ..... *G06K 9/00228* (2013.01); *G06K 9/00335* (2013.01); *G06T 13/40* (2013.01); *G06K 2009/00322* (2013.01)
(58) Field of Classification Search
  USPC .......................................................... 345/633
  See application file for complete search history.

(56) References Cited

U.S. PATENT DOCUMENTS

| | | | |
|---|---|---|---|
| 9,299,350 | B1 | 3/2016 | Dumont et al. |
| 2007/0074114 | A1* | 3/2007 | Adjali ................ G06F 3/01 715/706 |
| 2008/0300010 | A1* | 12/2008 | Border ............... H04N 5/2621 455/556.1 |
| 2011/0296324 | A1* | 12/2011 | Goossens ........... G06F 3/04883 715/763 |
| 2013/0089245 | A1 | 4/2013 | Yamazaki et al. |
| 2013/0222585 | A1 | 8/2013 | Neville et al. |
| 2013/0249948 | A1* | 9/2013 | Reitan ................ G06T 19/006 345/633 |
| 2014/0074454 | A1 | 3/2014 | Brown et al. |
| 2014/0267544 | A1* | 9/2014 | Li ...................... H04M 1/72427 348/14.02 |
| 2015/0186154 | A1 | 7/2015 | Brown et al. |
| 2015/0206349 | A1* | 7/2015 | Rosenthal ........ H04N 5/232935 345/633 |
| 2015/0235610 | A1* | 8/2015 | Miller ................ G06K 9/38 345/633 |
| 2016/0063989 | A1 | 3/2016 | Deleeuw |
| 2017/0011745 | A1* | 1/2017 | Navaratnam ........ G06Q 30/016 |
| 2017/0036112 | A1 | 2/2017 | Boncyk et al. |
| 2018/0088787 | A1* | 3/2018 | Bereza ................ G06F 3/04845 |
| 2018/0165854 | A1* | 6/2018 | Du ..................... G06F 3/017 |

OTHER PUBLICATIONS

PCT International Preliminary Report and Patentability, Application No. PCT/IB2018/056593, International filing date Aug. 29, 2018, Aggarwal, Abhinav, dated Dec. 10, 2019, 55 pgs.

PCT International Search Report and Written Opinion; Application No. PCT/IB2018/056593, International filing date of Aug. 29, 2018, Applicant Aggarwal, Abhinav, dated Dec. 14, 2018, 9 pages.

* cited by examiner

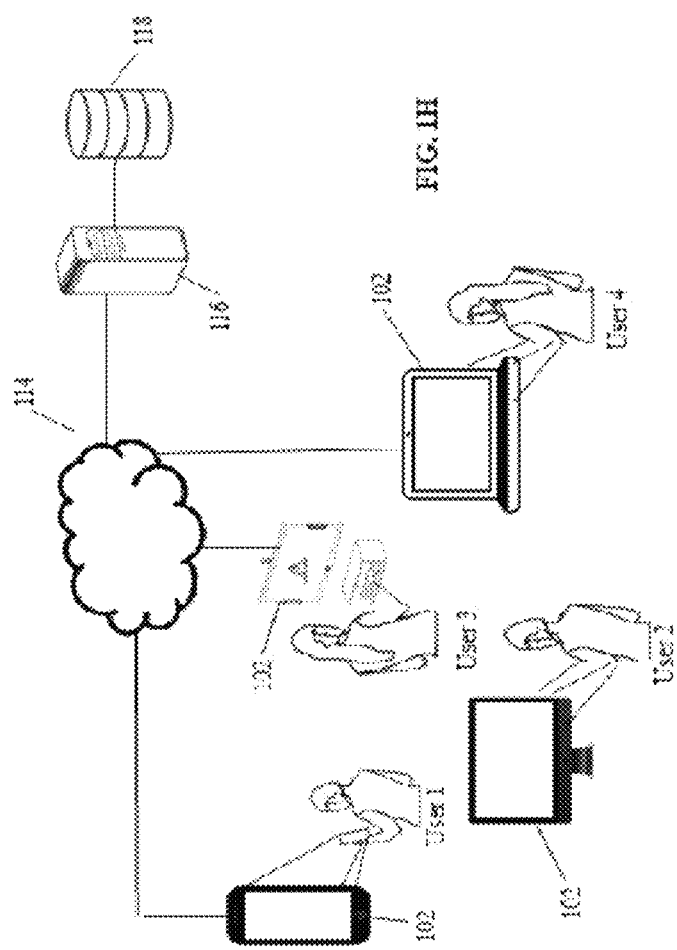

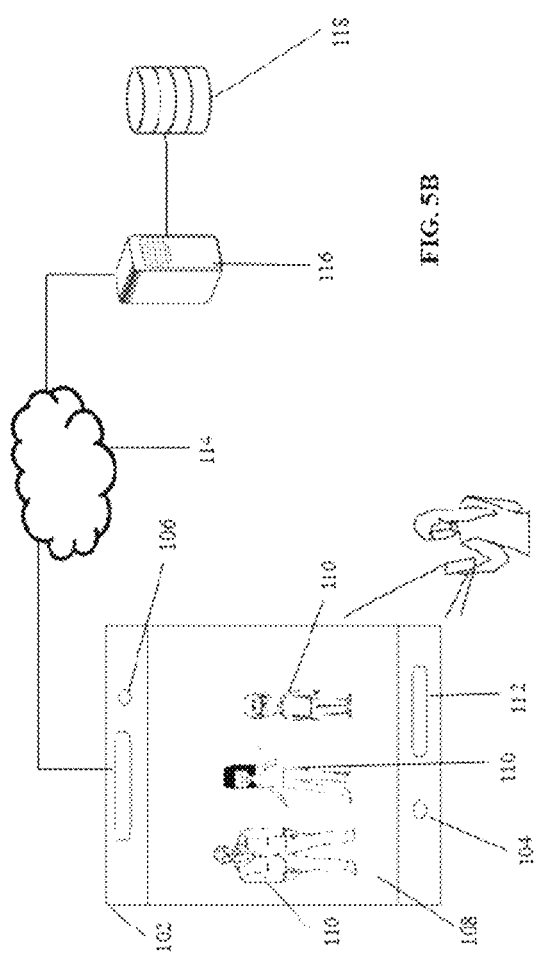

SYSTEMS AND METHODS FOR MIXED REALITY INTERACTIONS WITH AVATAR

TECHNICAL FIELD

The present invention relates generally to a system and a method for mixed reality interactions through interactive participation, and, particularly but not exclusively, to integrate the system and the method thereof for interaction with virtual onscreen avatar through various recognition mechanism where one or several present or remote users can simultaneously participate and attend the needs of interaction in an organized manner with a completely natural way of interacting and the virtual onscreen avatar reacting to the users voice and gestural action with its own audio and video outputs which provides the user an experience of interacting with a living entity rather than a mechanical entity.

BACKGROUND ART

The recent growth of the electronics and information technology industry has accelerated the demand for most of the information processing and communication products wherein the data/information input is provided to the information processing and communication products through input devices and the processed information is accessed through output devices. Most interaction with programs either on computers or on smartphones/mobile phones is through the user clicking on menus of options and on-screen buttons and typing more detailed instructions or information when required. The presentation of most information in computer programs is either through static text or images or in case of video and audio entire audio files which the user needs to view or listen to from start to finish.

In the scenario where the user of a computer or smartphone may want the program to undertake a specific instruction or order the user may need to navigate through a wide variety of menus and click multiple buttons and options. The output of information of most computer programs is either text/images or audio/video files. In the case of both the user maybe searching for relevant information or have a specific query but has to scroll through vast amounts of texts/images or in case of audio and video listen/see the entire video to find the relevant content rather than just get the answer to their query.

For authentication both phones as well as computers use passwords which are cumbersome to remember and can be hacked due by brute force or by people who know the user guessing the password.

The current models of interface on computing provide information to the user as simple text and images and in some cases video however the user needs to undertake extensive effort to assimilate the information and it is not provided to him very naturally. There is no element of humanness in the interaction with the inputting of data and output having in a mechanical fashion. The user receives outputs in a digital format and most users prefer interacting with human service agents rather than with computing interfaces. Such computer interfaces require users to expend significant effort understanding and assimilating the information provided. Also, the interaction medium is fairly constricted and the user cannot use his natural interaction paradigm of speech and gestures rather having to depending on mechanical activity such as typing, clicking or tapping at screen. Input of information through keyboard/mouse or touchscreen also requires much more effort than simply speaking. Finally, identification and authentication on most of these platforms is done through passwords which users find difficult to remember and are often hacked.

Hence, there is a need for an interface which allows for the user to feel as if he/she is interacting with a living entity which can through audio and visual output behave and perform as if it is an intelligent being and can react to the user's natural way of interaction wherein the user uses his/her voice and gestures.

Hence, there is a need for an integrated platform for managing the growing massive collection of data simultaneously flowing in the background to provide information to the user.

Hence, there is a need of a system and a method thereof where the virtual and real worlds come together to create new environments in which both digital and physical objects and their data can coexist and interact with one another through an intelligent and effective interface having great potential with regard to simultaneous participation of a singular or plurality of users in an organized manner with a completely natural way of interacting.

It is with respect to these considerations and others that the disclosure made herein is presented.

OBJECT OF THE INVENTION

Some of the objects of the present disclosure aimed to ameliorate one or more problems of the prior art or to at least provide a useful alternative are listed herein below.

An object of the present disclosure is to provide a computer implemented method and a computer system for interacting using human actions such as speech and/or gestures for eliciting visual and audio responses of a virtual avatar/person/entity to a single or plurality of present or remote users.

Another object of the present disclosure is to provide a computer implemented method and a computer system wherein the virtual and real worlds are brought together to create new environments in which both virtual avatars and physical actions such as speaking or gesturing of a single or plurality of users can coexist and interact with one another through an intelligent and effective interface.

Another object of the present disclosure is to provide a computer implemented method and a computer system where the virtual and real worlds are brought together to create new environments in which both virtual avatars and physical actions such as speaking or gesturing of a single or plurality can coexist and interact with one another through an intelligent and effective interface.

Another object of the present disclosure is to provide a computer implemented method and a computer system where a user or plurality of users interact with virtual avatars which can understand the voice and gestures of the user/users to interact with them.

Another object of the present disclosure is to provide a computer implemented method and a computer system having great potential with regard to simultaneous participation of plurality of users in an organized manner, with a completely natural way of interacting with one or several avatars.

Another object of the present disclosure is to provide a computer implemented method and a computer system where virtual avatar reacts to the user in real time in a continuous interaction paradigm resembling dialogue and interaction between two humans.

Another object of the present disclosure is to provide an objective and adaptable approach that can be extended to multiple domains. Other objects and advantages of the present disclosure will be more apparent from the following description when read in conjunction with the accompanying figures, which are not intended to limit the scope of the present disclosure.

SUMMARY OF THE INVENTION

Embodiments of the present invention aim to provide a method and a system for mixed reality interactions with an avatar. The method and the system for mixed reality interactions with an avatar offer a number of advantages. A user can actively interact with the avatar and perform number of transactions related in to the field in which the invention has been deployed. The invention can be completely automated with the use of hardware such as camera, speakers, microphones and display devices and the user can perform a number of transactions just through voice commands, gestural inputs or facial expressions. User data such as name, voice signatures, facial images and other parameters such as age and gender can be detected and stored for future referencing and providing a customized experience to the user.

According to a first aspect of the present invention, there is provided a method for mixed reality interactions with an avatar, comprising steps of receiving one or more of an audio input through a microphone and a visual input through a camera, displaying the avatar that interacts with a user through one or more of an audio outputted from one or more speakers and a video outputted from a display device wherein said avatar has an ability of creating/instantiating, based on context of interaction between said user and said avatar, a second avatar and enable interaction between the user and the second avatar, and wherein the interaction between the avatar and the user is performed based on facial recognition of the user by the avatar in a manner such that: if, based on a facial recognition match with historical stored facial images, the user is determined to an existing user, the avatar interacts with the user based on historical behavior of the user, the users' profile, and user input context; if, based on a facial recognition match with historical stored facial images, the user is determined to be a new user, the avatar determines one or more facial attributes of the new user, and interacts with the new user keeping in context the one or more facial attributes; and receiving one or more of a further audio input through the microphone and a further visual input through the camera.

In one embodiment of the invention, the method further comprises a step of selecting the user's facial attributes from any or a combination of gender, age, hair color, attire and style of dressing.

In one embodiment of the invention, the method further comprises a step of interaction between said avatar and said user and presenting, to said user, on the display of the computing device, one or more options to select from, wherein said one or more options are customized for said user.

In one embodiment of the invention, the method further comprises a step of accessing said avatar by a plurality of remote users, that are remotely connected with said avatar through respective computing devices, wherein the user is a part of said plurality of users.

In one embodiment of the invention, the method further comprises a step of simultaneous interaction of the plurality of remote users with the avatar.

In one embodiment of the invention, the method further comprises a step of receiving the audio input in the form of any or a combination of one or more of a sentence, phrase, word spoken by the user or a plurality of user in one or more languages spoken by the user, wherein the avatar adapts and interacts with the user in the one or more user's spoken languages.

In one embodiment of the invention, the visual input comprises one or more of a gestural input from the user, a facial image of the user and an image of an object.

In one embodiment of the invention, the avatar interacts with the user by having an actual human-like conversation using audio and visual outputs and behaves as a living entity by understanding the user's speech and gestures and responding to them using audio and visual outputs.

In one embodiment of the invention, the visual input comprises one or more of gestural input from the user, facial image of the user, and image of an object associated with the user. Further, the object is identified from the image of the user by the avatar and the avatar interacts with the user relating to the identified object.

In one embodiment of the invention, the method further comprises a step of comparing the facial image of the user with a plurality of historical facial images stored in a database and the avatar interacting with the existing user in the users' preferred language and format.

In one embodiment of the invention, the further visual input comprises facial input or gestural input of the user and the avatar switches from a set of avatars.

In one embodiment of the invention, the method further comprises a step of identifying commands from one or more of the audio input and the visual input, wherein the audio output and the video output are correlated with the identified commands.

In one embodiment of the invention, the method further comprises a step of authenticating an identity of the user, from one or more of the audio input and the visual input by taking user details through a conversational format, and using the taken user details to sign the user for one or more memberships or workflows.

According to a second aspect of the invention, there is provided a system for mixed reality interactions with an avatar, comprising a microphone, a camera, a display device, one or more speakers and an interface module. The interface module is configured to receive one or more of an audio input, through the microphone and a visual input, through the camera, display an avatar, that is configured to interact with a user, through one or more of an audio outputted from the one or more speakers and a video outputted from the display device wherein the avatar has an ability of creating/instantiating, based on context of interaction between the user and the avatar, a second avatar and enable interaction between the user and the second avatar, and wherein the interaction between the avatar and the user is performed based on facial recognition of the user by the avatar in a manner such that: if, based on a facial recognition match with historical stored facial images, the user is determined to an existing user, the avatar interacts with the user based on historical behavior of the user, the users' profile, and user input context; if, based on a facial recognition match with historical stored facial images, the user is determined to be a new user, the avatar determines one or more facial attributes of the new user, and interacts with the new user keeping in context the one or more facial attributes; and receive one or more of a further audio input through the microphone and a further visual input through the camera.

In one embodiment of the invention, the system further comprises a step of selecting the user's facial attributes from any or a combination of gender, age, hair color, attire and style of dressing.

In one embodiment of the invention, the system further comprises a step of interaction between said avatar and said user and presenting, to said user, on the display of the computing device, one or more options to select from, wherein said one or more options are customized for said user.

In one embodiment of the invention, the system further comprises a step of accessing said avatar by a plurality of remote users, that are remotely connected with said avatar through respective computing devices, wherein the user is a part of said plurality of users.

In one embodiment of the invention, the system further comprises a step of simultaneous interaction of the plurality of remote users with the avatar.

In one embodiment of the invention, the system further comprises a step of receiving the audio input in the form of any or a combination of one or more of a sentence, phrase, word spoken by the user or a plurality of user in one or more languages spoken by the user, wherein the avatar adapts and interacts with the user in the one or more user's spoken languages.

In one embodiment of the invention, the visual input comprises one or more of a gestural input from the user, a facial image of the user and an image of an object.

In one embodiment of the invention, the system comprises a step of the avatar interacting with the user by having an actual human-like conversation using audio and visual outputs and behaving as a living entity by understanding the user's speech and gestures and responding to them using audio and visual outputs.

In one embodiment of the invention, the system comprises a visual processing module for determining visual input. The visual input comprises one or more of gestural input from the user, facial image of the user, and image of an object associated with the user. Further, the object is identified from the image of the user by the avatar and the avatar interacts with the user relating to the identified object.

In one embodiment of the invention, the system further comprises a visual processing module configured to compare the facial image of the user with a plurality of historical facial images stored in a database and the avatar interacting with the existing user in the users' preferred language and format.

In one embodiment of the invention, the further visual input comprises one or more of a gestural input from the user and facial features of the user and the avatar switching from a set of avatars.

In one embodiment of the invention, the system further comprises a visual processing module, an audio processing module and a cognitive engine, wherein the visual processing module is configured to identify commands from the visual input, the audio processing module is configured to identify commands from the audio input and the cognitive engine is configured to correlate the audio output and the video output with the identified commands.

In one embodiment of the invention, the system further comprises an authentication module configured to authenticate an identity of the user, from one or more of the audio input and the visual input by taking user details through a conversational format, and using the taken user details to sign the user for one or more memberships or workflows.

In the context of the specification, the term "camera" refers to any device capable of performing imaging through which the device is capable of collecting electromagnetic radiation signals (such as visible light or infra-red) reflected from an object or a living being, that allow reproduction of an image of the object or the living being.

In the context of the specification, the term "image" refers to an image having a single frame or multiple frames collected over a time period. Further, the image may be a 2-Dimensional image or a 3-Dimensional image including depth data, such as that captured by range imaging devices, in order to allow generation of 3-Dimensional representations of an object or a living being.

In the context of the specification, the term "microphone" refers to any device used for capturing of sound that may be present in the art or may be developed in foreseeable future.

In the context of the specification, the term "avatar" refers to a graphical representation of a virtual or a real agent that may be embedded with predefined scripts and responses for interacting with human beings for performing certain services and may also be able to generate newer scripts and responses through machine learning algorithms. The avatar may also be capable of responding to audio inputs and gestural inputs and their responses may include visual and audio outputs. The avatar may also be supported by image processing and natural language processing algorithms to perform their functions.

In the context of the specification, the term "audio input" refers to one or more of any kind of sentence, phrase or word spoken or sound made by the user depending upon a specific requirement of an application or design of the present invention. Further, the audio input which comprises of a combination of one or more sentences, phrases, words, music, song or any other verbal message or instructions from the user can be in any one or more of the languages spoken by the user.

In the context of the specification, the term "gestural input" refers to one or more of any kind of physical movement of a user in form of movement of a hand, head, legs or any other part of the body or movement of the entire body, depending upon a specific requirement of an application or design of the present invention. Further, the gestural input may or may not involve direct contact with a display device, such as a screen or a projection.

In the context of the specification, the term "historical" in execution of a command refers to anything pertaining to a time instant(s) that is earlier than a time instant of an initiation of the command.

In the context of the specification, the term, "real-time", refers to without intentional delay, given the processing limitations of hardware/software/firmware involved and the time required to accurately measure/receive/process/transmit data as practically possible.

BRIEF DESCRIPTION OF THE ACCOMPANYING DRAWINGS

So that the manner in which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiments of this invention and are therefore not to be considered limiting of its scope, for the invention may admit to other equally effective embodiments.

These and other features, benefits, and advantages of the present invention will become apparent by reference to the following text figure, with like reference numbers referring to like structures across the views, wherein:

FIG. 1H illustrates an exemplary environment showing plurality of remote users interacting with an avatar simultaneously;

FIG. 5B illustrates an exemplary environment for generating and displaying one or more avatars simultaneously and the avatars further inviting one or more avatars to the screen based on the user input;

DETAILED DESCRIPTION OF THE PREFERRED EMBODIMENTS

Figure 1A:
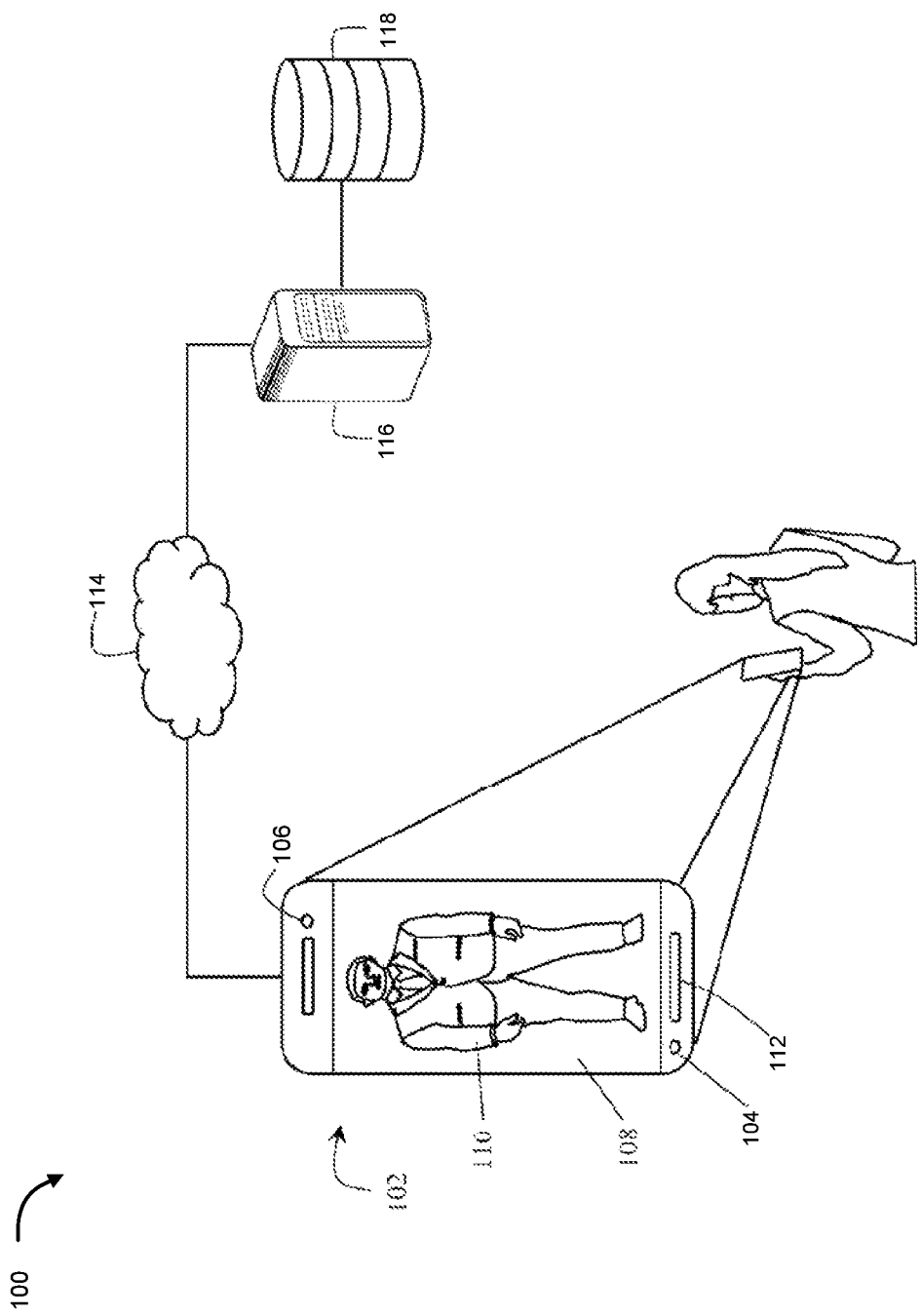
FIG. 1A illustrates an exemplary environment to which various embodiments of the present invention may be implemented.

While the present invention is described herein by way of example using embodiments and illustrative drawings, those skilled in the art will recognize that the invention is not limited to the embodiments of drawing or drawings described, and are not intended to represent the scale of the various components. Further, some components that may form a part of the invention may not be illustrated in certain figures, for ease of illustration, and such omissions do not limit the embodiments outlined in any way. It should be understood that the drawings and detailed description thereto are not intended to limit the invention to the particular form disclosed, but on the contrary, the invention is to cover all modifications, equivalents, and alternatives falling within the scope of the present invention as defined by the appended claim. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Any discussion of documents, acts, materials, devices, articles and the like is included in the specification solely for the purpose of providing a context for the present invention. It is not suggested or represented that any or all of these matters form part of the prior art base or were common general knowledge in the field relevant to the present invention.

In this disclosure, whenever a composition or an element or a group of elements is preceded with the transitional phrase "comprising", it is understood that we also contemplate the same composition, element or group of elements with transitional phrases "consisting of", "consisting", "selected from the group of consisting of, "including", or "is" preceding the recitation of the composition, element or group of elements and vice versa.

The present invention is described hereinafter by various embodiments with reference to the accompanying drawing, wherein reference numerals used in the accompanying drawing correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the invention.

Referring to the drawings, the invention will now be described in more detail. FIG. 1A illustrates an exemplary environment 100 to which various embodiments of the present invention may be implemented. As shown in FIG. 1A, the environment comprises a computing device 102 associated with a user. The computing device 102 is envisaged to have computing capabilities for enabling mixed reality interactions with an avatar.

Figure 1B:
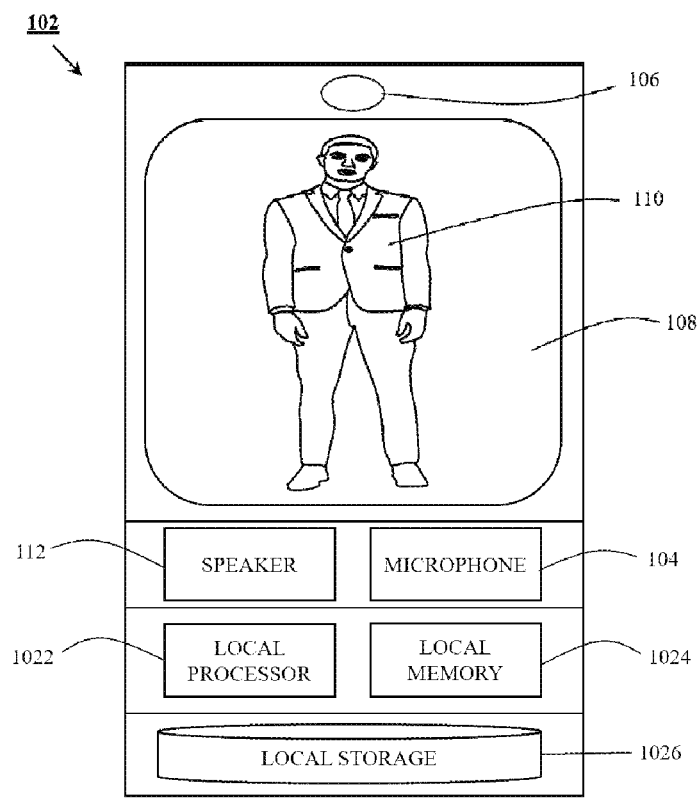
FIG. 1B illustrates a logical diagram of a computing device, in accordance with an embodiment of the present invention.

FIG. 1B illustrates a logical diagram of the computing device 102, in accordance with an embodiment of the present invention. In that manner, the computing device 102 is envisaged to include a local processor 1022 and a local memory 1024. In various embodiments, the local processor 1022 is one of, but not limited to, Field Programmable Gate Array (FPGA), Application Specific Integrated Circuit (ASIC), a general purpose or an ARM based processor. Additionally, the local memory 1024 is one of, but not limited to, EPROM, EEPROM and Flash memory and other non-volatile forms of memory etc. The local memory 1024 is envisaged to store machine readable instructions for execution by the local processor 1022. The computing device 102 may also be envisaged to have additional storage capabilities in form of additional local storage 1026. The local storage 1026 may in itself be another device or a drive or a partition or segment of the local memory 1024, that is configured to store data pertaining to a user. However, presence of the local storage 1026 is not binding and the local memory 1024 may perform the duties of the local storage with or without any special configuration.

Additionally it is envisaged that the computing device 102 be provided with other devices such as a microphone 104, a camera 106, a display device 108 and one or more speakers 112. In various embodiments, the display device 108 is one of, but not limited to, an LCD screen and an LED screen. Similarly, there are many technology options available for the camera 106, the microphone 104 and the one or more speakers 112. In various other embodiments, one or more of the microphone 104, the camera 106, the display device 108 and the one or more speakers 112 have been externally connected to the computing device 102 for enabling the invention.

The computing device 102 and the other devices such as the microphone 104, the camera 106, the display device 108 and the one or more speakers 112 may be connected to a network 114. In accordance with various embodiments, the network 114 is a Local Area Network (LAN) or a Wide Area Network (WAN) implemented through a number of protocols such as, but not limited to, 802.x, Bluetooth, ZigBee, HSDPA and LTE etc. Preferably, the network 114 is Internet. Further connected to the network 114 is a server 116 associated with a service. The service may be a telecom provider or media or financial institution or a retail outlet or Healthcare Service Provider (HSP), or any other service where the present invention may be applicable. The server 116 too is contemplated to have computing capabilities such as one or more processors and a memory unit.

Figure 1C:
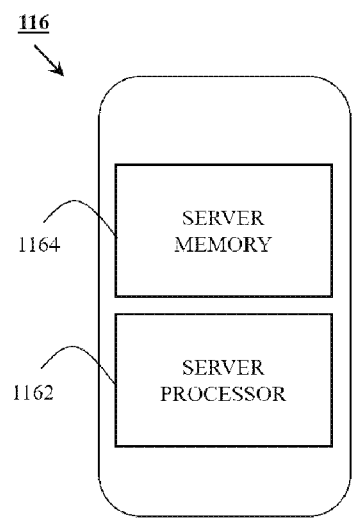
FIG. 1C illustrates a logical diagram of a server, in accordance with an embodiment of the present invention.

FIG. 1C illustrates a logical diagram of the server 116, in accordance with an embodiment of the present invention. The server 116 includes a server processor 1162 and a server memory 1164. Similar to the computing device 102, the server processor 1162 may be one of, but not limited to, Field Programmable Gate Array (FPGA), Application Specific Integrated Circuit (ASIC), a general purpose or an ARM based processor. Additionally, the server memory 1164 may be one of, but not limited to, EPROM, EEPROM and Flash memory and other non-volatile forms of memory etc. The server memory 1164 is envisaged to store machine readable instructions for execution by the server processor 1162. The server 116 has a storage device 118 associated with the server 116. In that manner, the storage device 118 may be in built device within the server 116, a dedicated storage device but locally present or a remote storage device connected through a network, such as a cloud based storage device etc. The storage device 118 is configured to store a number of databases related with the service.

Figure 1D:
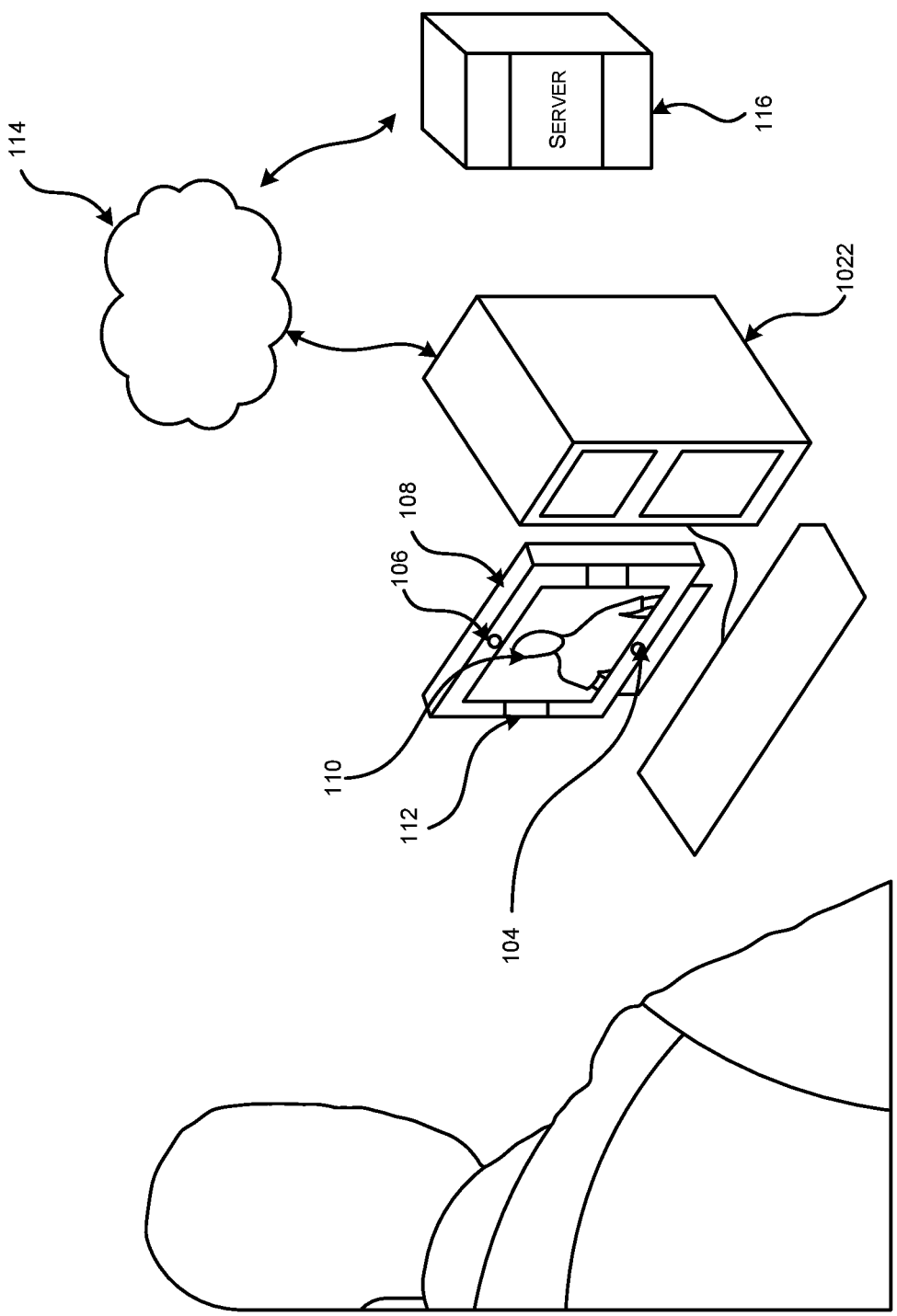
FIG. 1D-1G illustrates several forms that the computing device may embody, according to several embodiments of the present invention.
Figure 1E:
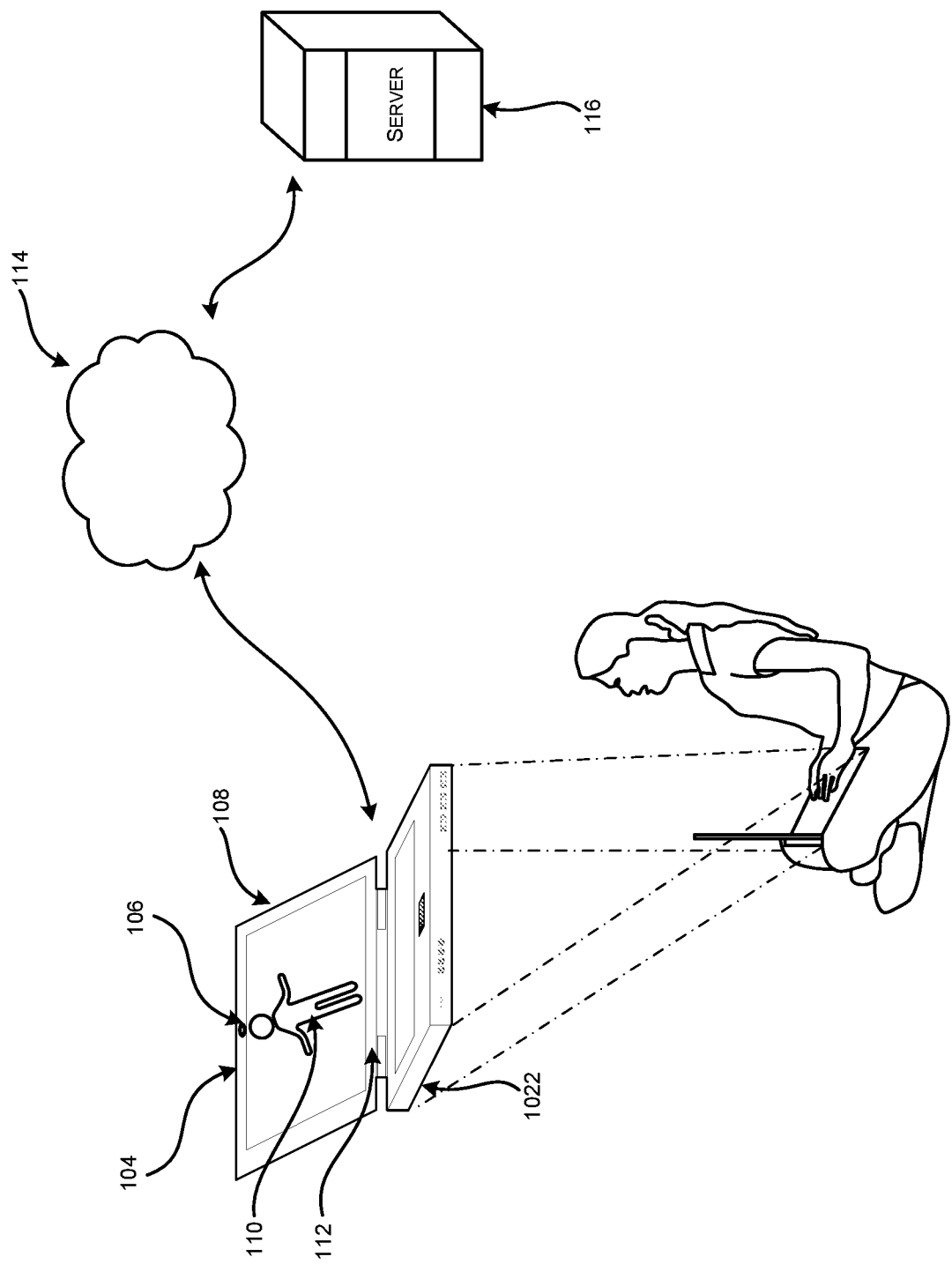
Figure 1F:
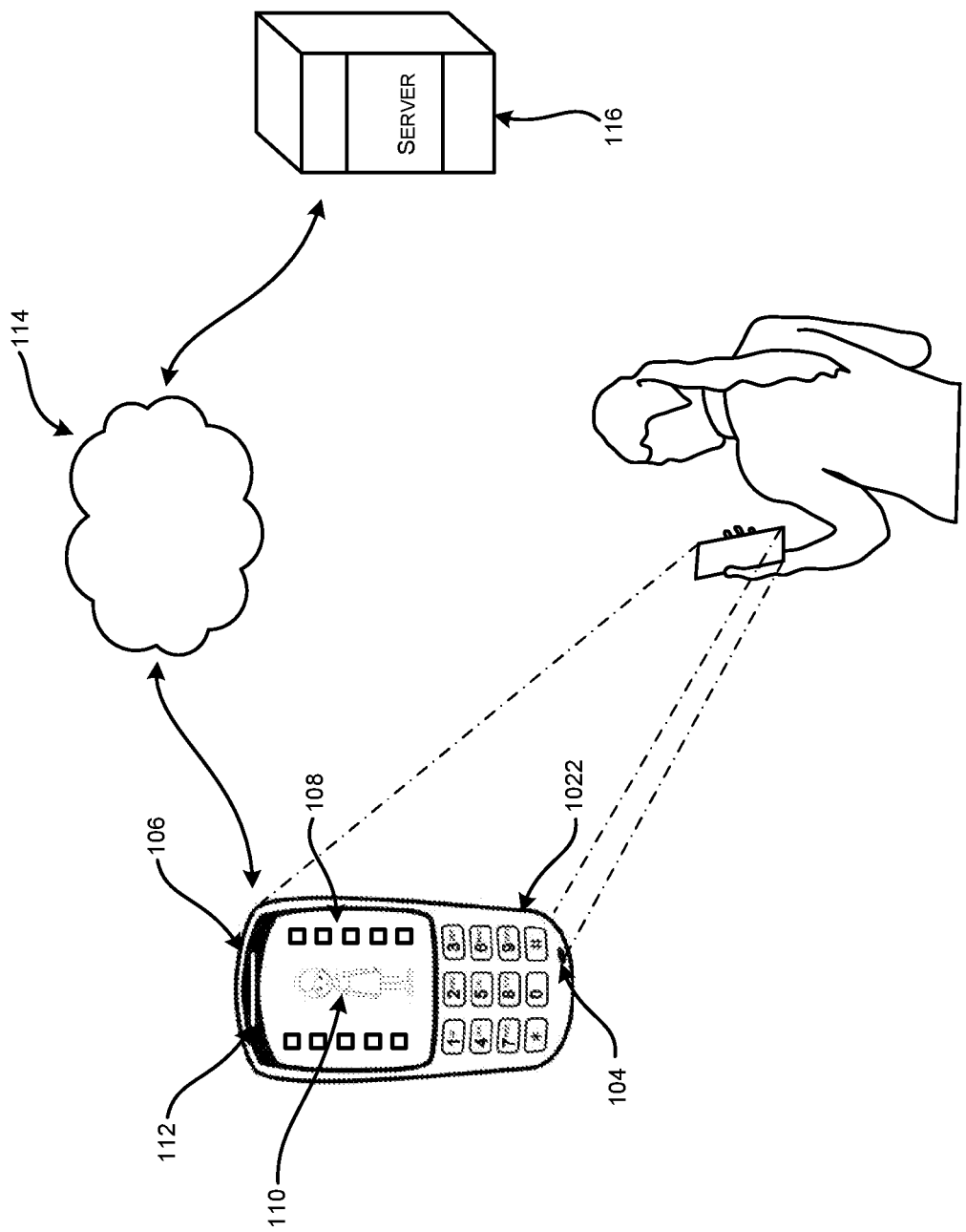
Figure 1G:
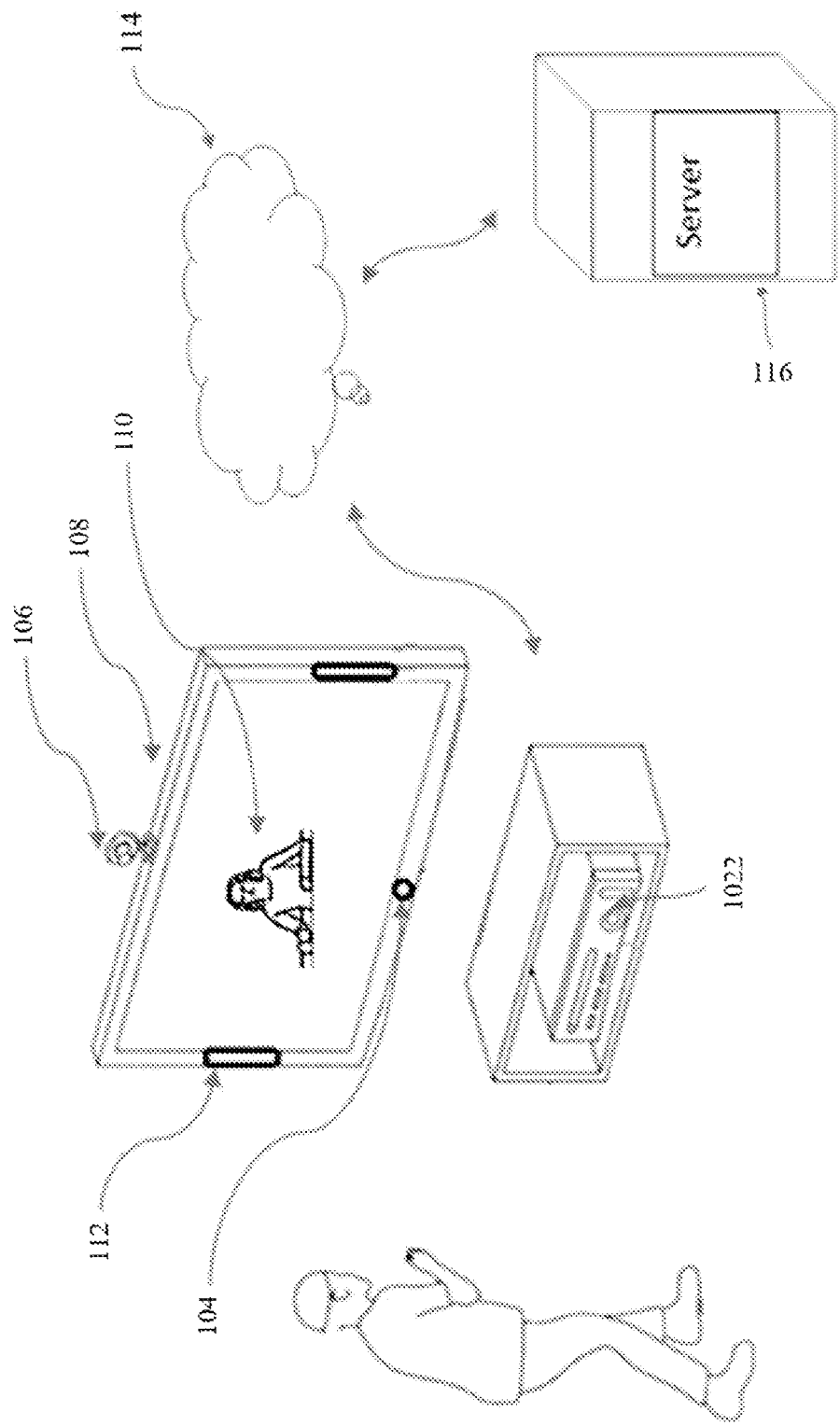

The computing device 102 is envisaged to be present at the end of the user and may embody many forms. FIG. 1D-1G illustrates several forms that the computing device 102 may embody, according to several embodiments of the present invention. According to an embodiment of the present invention, the display device 108, the local processor 1022, the microphone 104, the camera 106 and the one or more speakers 112 can be prebuilt components of a phone (e.g. shown in FIG. 1A). However, the display device 108, the local processor 1022, the microphone 104, the camera 106 and the one or more speakers 112 can also be the component of other prebuilt systems like a desktop computer (e.g. as shown in FIG. 1D), a laptop (e.g. as shown in FIG. 1E), a PDA (e.g. as shown in FIG. 1F). Alternatively, the display device 108, the local processor 1022, the microphone 104, the camera 106 and the one or more speakers 112 can be individual components integrated to construct a system as shown in FIG. 1G. FIG. 1H illustrates an exemplary environment showing plurality of the remote users interacting with an avatar simultaneously. As shown in FIG. 1H, user 1, user 2, user 3 and user 4 (plurality of remote users) each can have a computing device (102) that can enable interaction with an avatar (110) simultaneously over the network (114) and the server (116) and storage device (118) associated with the server (116).

The various embodiments of the present invention may now be elucidated with the exemplary environment 100 as reference. It is to be noted here that the method steps that will be described now, may be performed by the local processor 1022 acting entirely locally or the server processor 1162 acting entirely remotely, and acting individually. However, the method steps may also be performed by the local processor 1022 and the server processor 1162 acting together or in tandem in a client server environment. Depending upon where a particular step or a part of the step is being performed, the memory devices such as the local memory 1024, the local storage 1026, the server memory 1164 and the storage device 118, may come into play for tasks such as accessing machine readable instructions by respective processors, and reading and writing data etc. Alternately, as will be discussed later, the method steps may also be performed by a number of modules configured locally with the computing device 102 and/or remotely with the server 116. Again the modules themselves may be divided between the computing device 102 and the server 116 depending upon the applications and computing power requirements.

Figure 2:
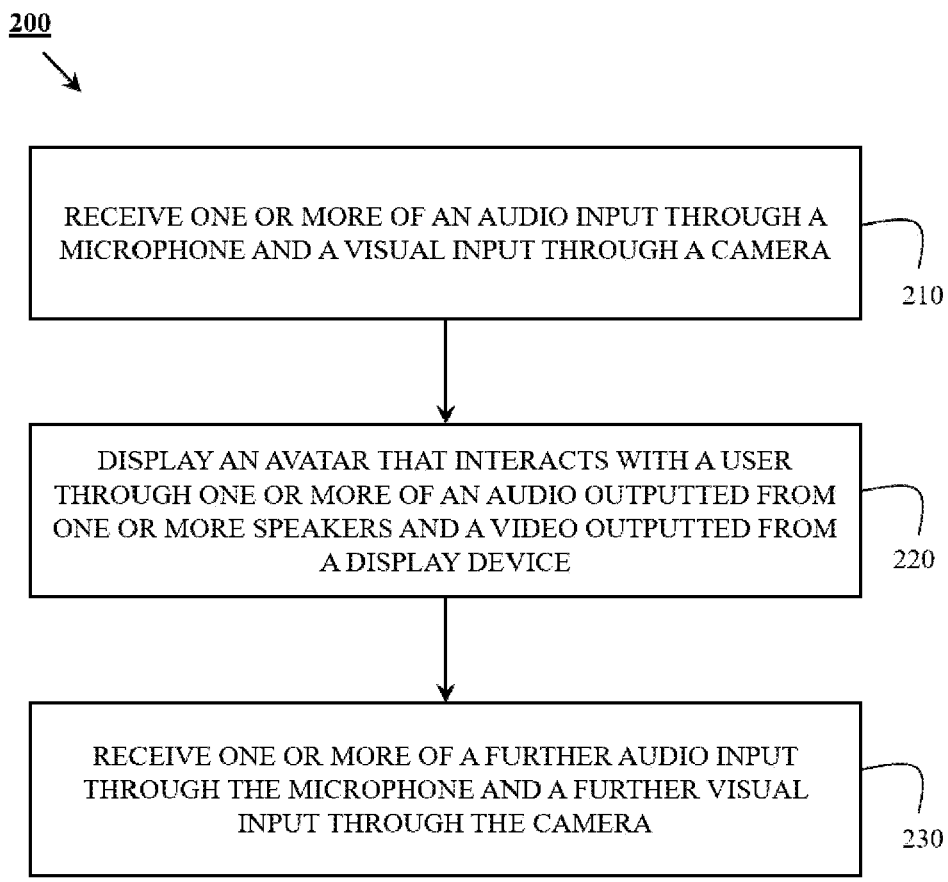
FIG. 2 illustrates a method for mixed reality interactions with an avatar, in accordance with an embodiment of the present invention.

FIG. 2 illustrates a method 200 for mixed reality interactions with an avatar, in accordance with an embodiment of the present invention. The method begins at step 210, by receiving one or more of an audio input through the microphone 104 and a visual input through the camera 106. In that manner, either an audio input may be received through the microphone 104, or visual input is received through the camera 106 or both the audio input and the visual input are received, through the microphone 104 and the camera 106, respectively. The one or more of the audio input and the visual input may be received at one or more of the computing device 102 by the local processor 1022 and the server 116 by the server processor 1162. According to various embodiments of the present invention, the visual input may comprise any one of more of a gestural input from the user, a facial image of the user and an image of an object. For example, the visual input may be received when the user or the object comes within a predetermined distance of the camera 106. Similarly, the audio input may be received when the user tries to communicate something to the microphone 104 or plays a pre-recorded audio file. In that manner it is envisaged that the user may start interacting with the computing device 102, by speaking or by playing an audio or by making different kinds of movements or just by changing facial expression or showing an object to the camera 106.

At step 220, one or more avatars 110 are displayed at the display device 108. The one or more avatars 110 are configured to interact with the user through an audio outputted from the one or more speakers 112. The one or more avatars can be configured to recognize the audio input of the user, the audio input being any through any or a combination of one or more sentences, phrases, words, music, song or any other verbal message or instructions from the user in one or more languages spoken by the user. The one or more avatars can also be configured to interact with the user through a video outputted from the display device 108. Further, the one or more avatars can be adapted/configured to interact with the user in the one or more of the user's spoken languages. The audio and the video outputs may happen alternately, individually or in tandem.

Figure 3:
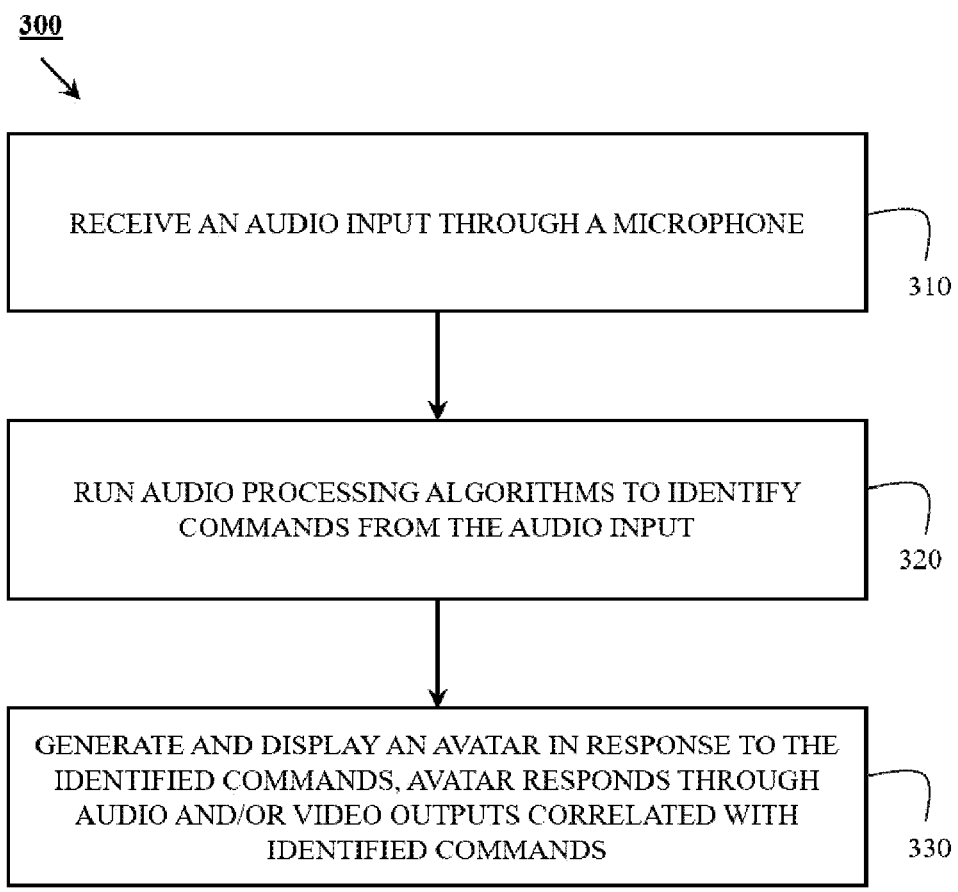
FIG. 3 illustrates a method for generating and displaying one or more avatars on receiving

FIG. 3 illustrates a method 300 for generating and displaying the one or more avatars 110 on receiving the audio input, in accordance with an embodiment of the present invention. At step 310, the audio input is received through the microphone 104 and either stored in the local storage 1026 or transmitted to the server 116 for storing in the storage device 118. However, the audio input may also be processed before being stored in any of the storage devices.

At step 320, the local processor 1022 or the server processor 1162 or both partially or in tandem, run audio processing algorithms to identify commands from the audio input. At step 330, in response to the identified commands, the one or more avatars 110 are generated and displayed at the display device 108, such that, the one or more avatars 110 respond through an audio output from the one or more speakers 112 or the video output from the display device 108 or both, correlated with the identified commands.

Figure 4:
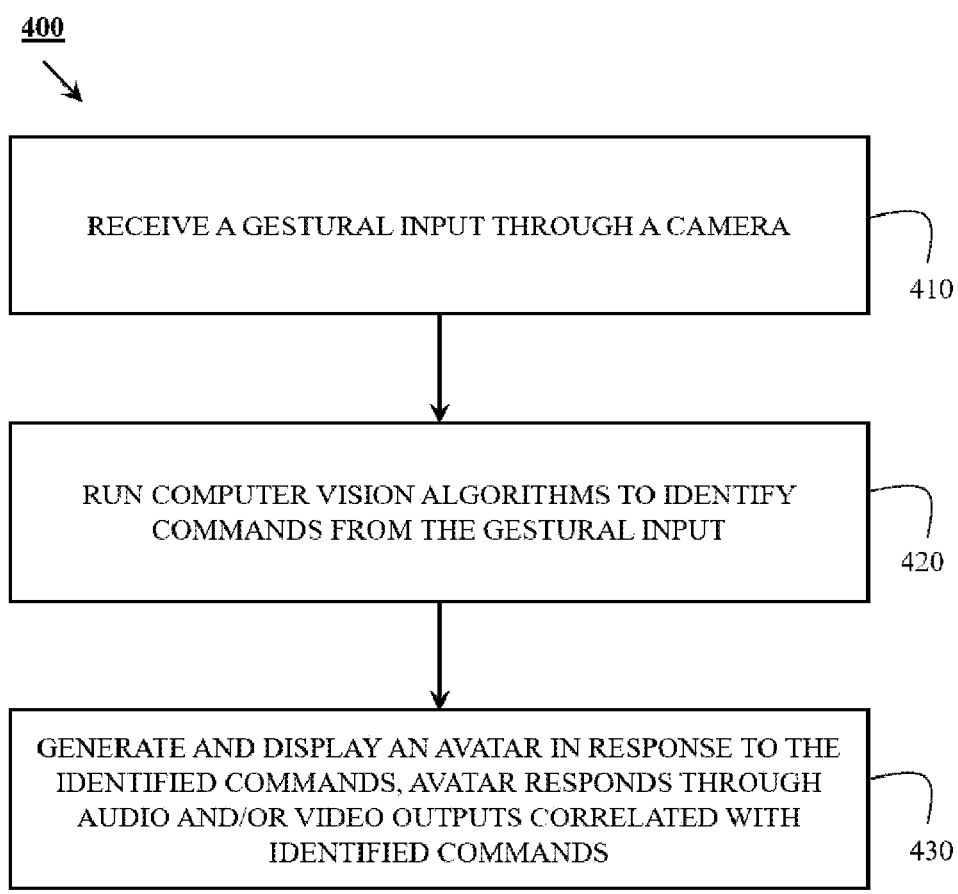
FIG. 4 illustrates a method for generating and displaying one or more avatars on receiving the gestural input within the visual input, in accordance with an embodiment of the present invention.

FIG. 4 illustrates a method 400 for generating and displaying the one or more avatars 110 on receiving the gestural input within the visual input, in accordance with an embodiment of the present invention. At step 410, the gestural input is received through the camera 106 and either stored in the local storage 1026 or transmitted to the server 116 for storing in the storage device 118. However, the gestural input may also be processed before being stored in any of the storage devices. At step 420, the local processor 1022 or the server processor 1162 or both partially or in tandem, run computer vision algorithms to identify commands from the gestural input. At step 430, in response to the identified commands, the one or more avatars 110 are generated and displayed at the display device 108, such that, the one or more avatars 110 respond through an audio output from the one or more speakers 112 or the video output from the display device 108 or both, correlated with the identified commands.

Figure 5A:
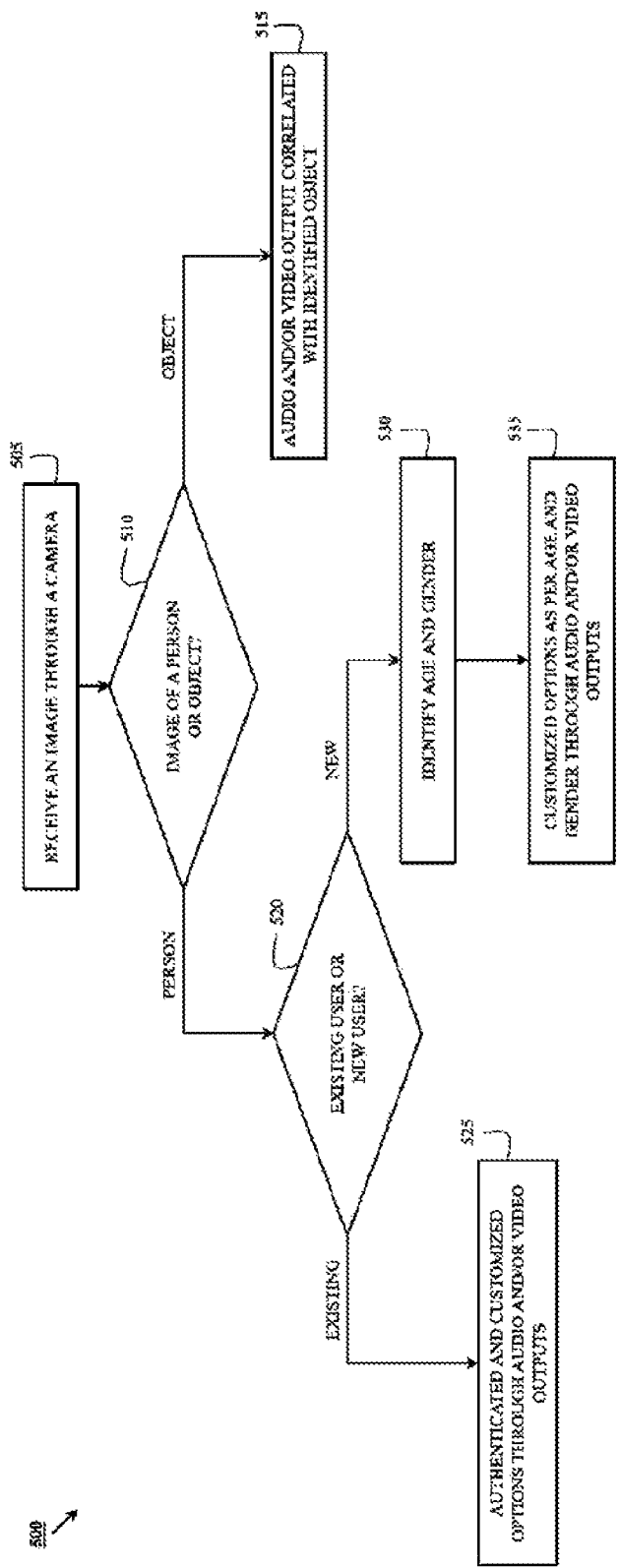
FIG. 5A illustrates a method for generating and displaying one or more avatars on receiving the facial image or the image of the object, within the visual input, in accordance with an embodiment of the present invention.

FIG. 5A illustrates a method 500 for generating and displaying the one or more avatars 110 on receiving the facial image or the image of the object, within the visual input, in accordance with an embodiment of the present invention. At step 505 an image is received through the camera 106. At step 510, the local processor 1022 or the server processor 1162 or both partially or in tandem, run image processing algorithms to identify if the image pertains to an object or a person. If the image pertains to an object, at step 515, the one or more avatars 110 so generated respond through an audio output from the one or more speakers 112 or the video output from the display device 108 or both, correlated with the identified object. For example, if the object is a piece of apparel, the one or more avatars 110 may provide make and cost of the piece of apparel.

However, if the image pertains to a person, or more specifically, is a facial image, at step 520, the facial image of the user is compared with a plurality of historical facial images stored in a database maintained in the storage device 118 or the local storage 1026. In case, the facial image of the user matches one of the plurality of historical facial images stored in the database, the user is identified as an existing user and at step 525 the one or more avatars 110 welcome the user, and provides a plurality of options to the user. The plurality options are customized and provided through the audio or video or both outputs from the one or more speakers 112 and the display device 108, respectively. The plurality of options has been authenticated and customized on basis of the facial image of the user matching with the one of the plurality of historical facial images stored in the database. For example, if the user frequently uses the invention in share trading, the prices of stocks which the user has been historically most interested in may be provided instantly through the video output or the audio output or both.

Alternately, the user is identified as a new user, and at step 530, an age and a gender of the user is detected by one or more of the local processor 1022 and the server processor 1162, from the facial image of the user. Further, the identification of appearance features like the user's hair color, the user's attire and style of dressing etc. is used for customization. Again at step 535, the one or more avatars 110 provide a plurality of options to the user, but this time, the plurality of options has been customized on basis of the age, gender and appearance features of the user. For example, if the user is interested in searching for specific eateries, the one or more avatars 110 may provide, through the video and/or the audio output, the list of eateries most frequented by a specific age group and a specific sex. For example, pubs that have special discounts on liquors, for women.

It has to be noted here that in any of the methods 300, 400 or 500, the user may be authenticated using the audio input or the visual input. For example, a specific keyword or a phrase may act as a password for authentication of an existing user. Alternately, some specific unique characteristics of the voice of the user may also act as means of authentication. Similarly, specific gestures, facial features and other biometric features, such as sclera scan, that can be captured using a camera of a predefined hardware capability may act as means of authentication. Alternately, an image of a predetermined object itself may act as a means of authentication.

At step 230, one or more of a further audio input through the microphone 104 and a further visual input through the camera 106, are received. In that manner, either a further audio input may be received through the microphone 104, or a further visual input is received through the camera 106 or both the further audio input and the further visual input are received, through the microphone 104 and the camera 106, respectively. In accordance with various embodiments, the further visual input comprises one or more of a gestural input from the user and facial features of the user. In this manner, the user can continue interacting with the one or more avatars 110.

As discussed above, the method steps for the methods 200, 300, 400 and 500 discussed above may be performed by the local processor 1022 and the server processor 1162, individually or in combination, executing machine readable instructions. However, the method steps may also be provided by a number of modules acting in tandem. These modules may be partially or completely provided at the computing device 102 and the server 116.

FIG. 5B illustrates an exemplary environment for generating and displaying multiple avatars simultaneously on receiving the gestural input through the camera (106) and the audio input through the microphone (104). Based on the gestural and audio input as mentioned in methods 200, 300, 400 and 500, the one or more avatars (110) can receive one or more of a further audio input through the microphone 104, and a further visual input through the camera 106 and facial features of the user. Based on the context of the user's input, the one or more avatars (110) can further switch to another avatar or invite another avatar to join the conversation with the user.

The avatars can also interact with each other as well as have a group discussion with the user. They can each have their own individual form factor, and have independent personalities. Each avatar can be an individual entity on the screen, and can enable interaction with other avatars and with the user.

Alternatively, an existing avatar has an ability to create a new avatar. The new avatar can be created based on nature/context of an interaction that takes place between the user and the existing avatar. The interaction between the avatar and the user is based on a facial recognition match. Upon the user's facial features being matched with the historical stored facial images, the user is determined to be an existing user and hence the avatar interacts with the user based on the user's profile and the user's input context. Upon the user's facial features being not matched with the historical stored facial images, the user is determined to be a new user and hence the avatar determines facial features of the new user and interacts with the new user based in context of the determined facial attributes.

Further, the avatar can present multiple customized options to choose from to the user based on facial attributes like age, gender, hair color, attire and style of dressing etc. In addition, the multiple users located at remote places can connect with the avatar using their computing devices. Also, the multiple users can interact with the avatar simultaneously.

Figure 6:
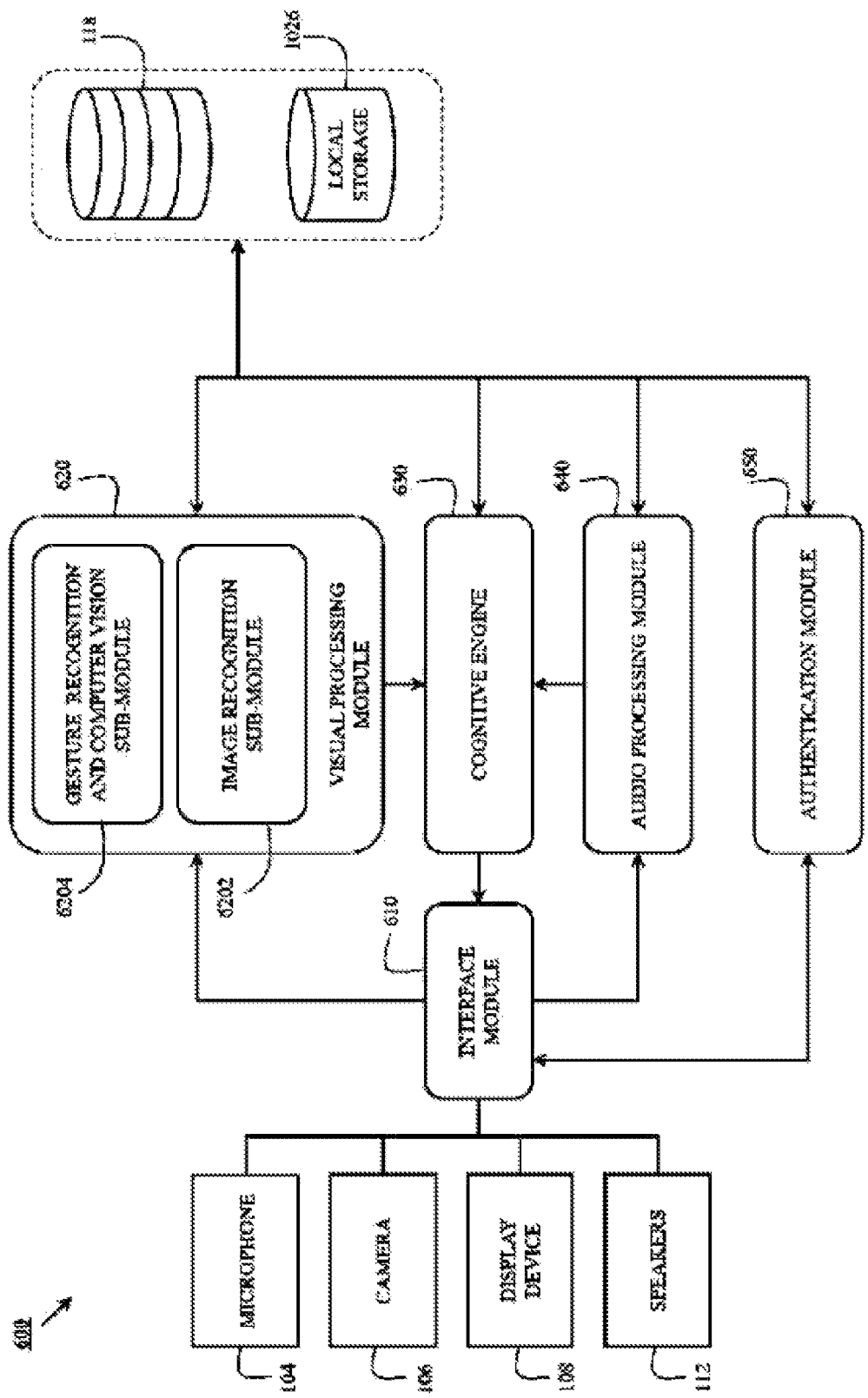
FIG. 6 illustrates a system for mixed reality interactions with an avatar, in accordance with an embodiment of the present invention.

FIG. 6 illustrates a system 600 for mixed reality interactions with the avatar 110, in accordance with an embodiment of the present invention. The system 600 includes the microphone 104, the camera 106, the display device 108, the one or more speakers 112 and an interface module 610. The interface module 610 is configured to receive the one or more of an audio input, through the microphone 104 and the visual input, through the camera 106, display the one or more avatars 110, that are configured to interact with a user, through one or more of the audio outputted from the one or more speakers 112 and the video outputted from the display device 108 and receive one or more of the further audio input through the microphone 104 and the further visual input through the camera 106.

Since the visual input comprises one or more of a gestural input from the user, a facial image of the user and an image of an object, the system 600 may further include a visual processing module 620 that may further include an image recognition submodule 6202 and a gesture recognition and computer vision submodule 6204. In one embodiment of the invention, the visual processing module 620 configured to identify the object from the image of the object, and the system 600 further includes a cognitive engine 630 configured to correlate the audio output and the video output with object identified. In one embodiment of the invention, visual processing module 620 is further configured to compare the facial image of the user with a plurality of historical facial images stored in a database. Also the cognitive engine 630 is further configured to customize a plurality of options on the basis of the facial image of the user matching one of the plurality of historical facial images stored in the database, wherein the interface module 610 is further configured to configured to provide the plurality of options to the user.

The audio processing module 640 processes the audio commands provided by the user and passes to the cognitive engine 630.

The cognitive engine 630 interprets and understands the user's audio and visual commands and then provides an appropriate response via the audio and video output of the one or more avatars 110.

In one embodiment of the invention, the visual processing module 620 is further configured to detect an age and a gender of the user from the facial image of the user. Further, the cognitive engine 630 is further configured to customize a plurality of options on the basis of the age and the gender of the user, wherein the interface module 610 is further configured to configured to provide the plurality of options to the user. In one embodiment of the invention, the visual processing module is configured to identify commands from the visual input, and the system 600 further includes an audio processing module 640 configured to identify commands from the audio input. Moreover, the cognitive engine 630 is further configured to correlate the audio output and the video output with the identified commands. In one embodiment of the invention, the system 600 further includes an authentication module 650 configured to authenticate an identity of the user, from one or more of the audio input and the visual input.

An exemplary embodiment of the present system and the method thereof is online or mobile retail/shopping wherein instead of the user having to use touchscreen or mouse/keyboard he could simply talk to the onscreen sales person avatars. Here the user does not need to navigate typical menus or search for options but undertakes the entire experience by talking and gesturing to the Avatar which then reacts to the users input in real time and provides him response. According to the exemplary embodiment the steps may be performed are:

Step 1, at least one user opens on his/her smartphone/mobile phone the retailer's website on his mobile browser or the mobile app or visits the retailer's website on his/her computer.

Step 2, Sales person Avatar welcomes the user in a generic manner. Meanwhile webcam in case of computer or smartphone camera in case of mobile phone takes a photo of the user and one of two scenario occurs.

Step 3A, if the user is an existing registered customer or loyalty card holder or someone who in some form is registered with the retailer then through facial recognition his/her face is matched with existing customer database of faces. Upon the face matching that of the customer the system authenticates the user and an avatar on the display provides him/her several personalized options for undertaking different shopping transactions. Secondly the system may calculate the user's propensity to be upsold or cross sold different products basis his/her age, gender, and past transaction pattern and the avatar can talk and inform the user about such products. The next step in this scenario is step 4.

Step 3B, in case the user is not a registered customer or loyalty card holder of the retailer the avatar can then interpret his/her age and gender using Computer Vision techniques and suggest different offers of the retailer which the user would be most likely to sign up for. Here the avatar can ask the users various questions such as name, date of birth, address and the user can simply answer using his voice and gestures and the avatar can help the user sign up as a registered user or loyalty card holder and then offer him/her different offers for relevant product. The avatar can also ask the user questions to determine which product would be the right fit for him/her and advise him/her about the different features of each product and help the user compare different products. Once the user is signed up then the avatar system identifies and authenticates him/her by his/her face and logs him/her in. The system then puts to step 4.

Step 4, the user on authentication undertakes a variety of tasks by giving voice and gesture based commands to the avatar. For example, the user can tell the avatar to purchase a particular product for him/her and have it delivered at his/her office address. Or the avatar can tell the user of a particular product which would go well with his/her last purchase. The avatar could undertake the action by connecting to the retailer's back end systems while at the same tell the user through speech and gesture that it has completed the task or there was an issue in completing the task and it needs further information from the user. The avatar through voice and body movements could also advise the user about different ongoing offers for instance higher than average discounts on particular types of jackets. Based on this advice the user can then undertake the advised action by the avatar by simply giving a verbal confirmation or making a gesture like a thumbs-up sign.

Step 5, the user can verbally inform the avatar after completing his/her shopping tasks that he/she wants to logout and the avatar can then log him/her out.

It should be noted that the above example is just one embodiment of the system and the different areas of usage of the invention span a plurality of other areas and fields. The present invention provides a number of advantages.

The present system and method thereof attains the goal to replace keyboards and flat touch enabled displays with new paradigms for communication and collaboration, bringing a major shift in user engagement.

The present system and method thereof attains the goal of replacing text and image based output of computing programs with intelligent avatars providing contextual answers to the users queries in a natural and human like manner bringing a major change in human digital interaction.

The present system and method thereof provides platform for mixed reality interactions through interactive participation, and, particularly but not exclusively, to integrate the system and the method thereof for interaction with virtual onscreen avatar through various recognition mechanism where one or several present or remote users can simultaneously participate and attend the needs of interaction in an organized manner with a completely natural way of interacting and seeing the output of their queries and commands.

The present system and method thereof provides platform for mixed reality interactions through interactive participation, and particularly for combining real world with virtual information and introducing virtual avatars/characters for interacting with a real audience.

The present system and method thereof provides integrated platform for the virtual and real worlds to come together to create new environments in which both digital and physical objects and their data can coexist and interact with one another through an intelligent and effective interface having great potential with regard to simultaneous participation of plurality of users in an organized manner with a completely natural way of interacting.

The present system and method thereof provides platforms where at least one user-member can register on platform.

The present invention, the present system and method thereof provides platforms where at least one user-member can register on platform by showcasing detailed profiles in a structured way.

The present system and method thereof uses virtual avatars which can recognize a user by his face, can interact with the user by understanding what the user is speaking and understanding the user's gestures. Additionally, the avatars give the output to the user in the form of speech and gestures of the avatar which is intuitively easy for the user to understand. Comprehending what the user is speaking and the user's gestures is a much more interactive and engaging method for the user to interface with his computer or phone. The speaking and gesture comes much more naturally to users than typing or tapping at a screen, thus providing interaction in an organized manner with a completely natural way of interacting.

The present system and method thereof uses virtual avatars which can recognize a user by his face. The face based authentication is more secure and easier to undertake for the user than remember passwords, thus providing complete natural way of authentication and experience continuity in their interaction.

The present system and method thereof provides the user with a completely natural way of interacting with a computing device with the use of onscreen avatars which understand the users voice, gestures as well as can authenticate and identify the users through the face. This may provide a whole new interact paradigm to users which makes computers/smartphones/mobile-phones much more natural and easy to interact with. Users do not need to learn their computing devices or phones and may not even have reading and writing skill but through conversations with the Avatar can use the device for different objectives. Simply by seeing the avatar and hearing the Avatar the user can be communicated vast amounts of contextually information without the user needing to expend much effort in assimilation and understanding of the same.

The present system and method thereof the relevant device (computer or smartphone) uses the camera attached or embedded in the device seeing the user. Based on this, it may compare the user to its database of faces and can identify the user's identity. Based on this identity recognition, the system can authenticate the user for more secure environments as well such as banking or stock trading.

In case the system fails/does not recognize the face, the present system and method thereof may run age and gender detection algorithms, the algorithm may detect the age and gender of the user and the present system and method thereof may accordingly customize the avatar experience for the user as well.

The present system and method thereof the avatar is either a video recording of a live actor or an animated like a cartoon/life like animation resembling human which may then speak to the user. (Effects like holographic effects may be added to the avatar image and plurality of actors) The user may then speak to the avatar on screen and using voice recognition the avatar will understand what is the required action the user wants it to perform. Basis of the present understanding, the Avatar may then provide the user information either by speaking or acting or pulling up certain text, video and image information for the user to view on the screen. The avatars speech may either be prerecorded or may be programmed by a text to speech engine. The avatar's understanding of the user's commands and speech may be based on a cognitive application which may then interpret the user's speech. Based on this, speech the cognitive application may provide Avatar with the text to speak and actions to make and information to display so as to convey the same information to the user. The user may also interact with the Avatar by gestures which the system may view through the camera and then interpret through computer vision algorithms.

A system and method for mixed reality interactions through interactive participation is disclosed. More particularly the present disclosure relates to the system and the method thereof for interaction with virtual onscreen avatar through various recognition mechanism where one or several present or remote users can simultaneously participate and attend the needs of interaction in an organized manner with a completely natural way of interacting as described above as if the user is interacting with real person. In some examples, the systems described herein, may include one or more processors, one or more forms of memory, one or more input devices/interfaces, one or more output devices/interfaces, and machine-readable instructions that when executed by the one or more processors cause the system to carry out the various operations, tasks, capabilities, etc., described above.

In some embodiments, the disclosed techniques can be implemented, at least in part, by computer program instructions encoded on a non-transitory computer-readable storage media in a machine-readable format, or on other non-transitory media or articles of manufacture. Such computing systems (and non-transitory computer-readable program instructions) can be configured according to at least some embodiments presented herein, including the processes described in above description.

The programming instructions can be, for example, computer executable and/or logic implemented instructions. In some examples, a computing device is configured to provide various operations, functions, or actions in response to the programming instructions conveyed to the computing device by one or more of the computer readable medium, the computer recordable medium, and/or the communications medium. The non-transitory computer readable medium can also be distributed among multiple data storage elements, which could be remotely located from each other. The computing device that executes some or all of the stored instructions can be a microfabrication controller, or another computing platform. Alternatively, the computing device that executes some or all of the stored instructions could be remotely located computer system, such as a server.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Further, while one or more operations have been described as being performed by or otherwise related to certain modules, devices or entities, the operations may be performed by or otherwise related to any module, device or entity. As such, any function or operation that has been described as being performed by a module could alternatively be performed by a different server, by the cloud computing platform, or a combination thereof.

Further, the operations need not be performed in the disclosed order, although in some examples, an order may be preferred. Also, not all functions need to be performed to achieve the desired advantages of the disclosed system and method, and therefore not all functions are required.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claim

We claim:

1. A method mixed reality interactions with an avatar, said method comprising steps of:
receiving, at a computing device, from a user, one or more of an audio input through a microphone, and a visual input through a camera;
displaying, on a display of said computing device, said avatar that interacts with the user through one or more of an audio outputted from one or more speakers, and a video outputted from a display,
wherein said avatar has an ability of creating/instantiating, based on context of interaction between said user and said avatar, a second avatar and enabling interaction between said user and said second avatar, and
wherein said interaction between said avatar and said user is performed based on facial recognition of said user by said avatar in a manner such that:
if, based on a facial recognition match with historical stored facial images, the user is determined to be an existing user, said avatar interacts with said user based on historical behavior of said user, said user's profile, and user input context;
if, based on a facial recognition match with historical stored facial images, the user is determined to be a new user, said avatar determines one or more facial attributes of said new user, and interacts with said new user keeping in context said one or more facial attributes; and
receiving, at said computing device, one or more of a further audio input through the microphone, and a further visual input through the camera.

2. The method as claimed in claim 1, wherein said facial attributes are selected from any or a combination of gender, age, hair color, attire and style of dressing.

3. The method as claimed in claim 1 wherein said interaction between said avatar and said user comprises presenting, to said user, on the display of the computing device, one or more options to select from, wherein said one or more options are customized for said user.

4. The method as claimed in claim 1, wherein said avatar is accessed by a plurality of remote users that are remotely connected with said avatar through respective computing devices, wherein the user is a part of said plurality of users, wherein the plurality of remote users interact with the avatar simultaneously.

5. The method as claimed in claim 1, wherein the audio input is in the form of any or a combination of one or more sentences, phrases, words, music, song or any other verbal message or instructions from the user in one or more languages spoken by the user, wherein the avatar adapts and interacts with the user in the one or more of the user's spoken languages.

6. The method as claimed in claim 1, wherein the avatar interacts with the user by having an actual human-like conversation using audio and visual outputs, and behaves as a living entity by understanding the user's speech and gestures and responding to them using audio and visual outputs.

7. The method as claimed in claim 1, wherein the visual input comprises one or more of gestural input from the user, facial image of the user, and image of an object associated with the user, wherein the method further comprises the step of: identifying, through the avatar, the object from the image of the object and interacting with the user relating to the identified object, wherein if the user is identified as the existing user, the avatar is customized on the basis of the facial image of the existing user, and wherein the avatar interacts with the existing user in the user's preferred language and format.

8. The method as claimed in claim 1, wherein based on the further audio or visual input comprising facial input or gestural input of the user, the avatar switches from a set of avatars present in system.

9. The method as claimed in claim 1, wherein the method further comprises the step of identifying commands from one or more of the audio input and the visual input provided by the user, such that the audio output and the video output of the avatar is correlated with the identified commands.

10. The method as claimed in claim 1, wherein the method further comprises the step of authenticating identity of the user from one or more of the audio input and the visual input, taking user details through a conversational format, and using the taken user details to sign the user for one or more memberships or workflows.

11. A system for mixed reality interactions with an avatar, comprising:
   a computing device operatively coupled with:
   a microphone;
   a camera;
   a display device;
   one or more speakers; and
   an interface module;
   wherein the interface module is configured to:
   receive, at the computing device, from a user, one or more of an audio input through the microphone, and a visual input through the camera;
   display, on the display device of said computing device, said avatar that interacts with the user through one or more of an audio outputted from the one or more speakers, and a video outputted from the display device,
   wherein said avatar has an ability to create/instantiate, based on context of interaction between said user and said avatar, a second avatar and enable interaction between said user and said second avatar; and
   wherein said interaction between said avatar and said user is performed based on facial recognition of said user by said avatar in a manner such that:
   if, based on a facial recognition match with historical stored facial images, the user is determined to be an existing user, said avatar interacts with said user based on historical behavior of said user, said user's profile, and user input context;
   if, based on a facial recognition match with historical stored facial images, the user is determined to be a new user, said avatar determines one or more facial attributes of said new user, and interacts with said new user keeping in context said one or more facial attributes; and
   receive, at said computing device, one or more of a further audio input through the microphone and a further visual input through the camera.

12. The system as claimed in claim 11, wherein said facial attributes are selected from any or a combination of gender, age, hair color, attire and style of dressing.

13. The system as claimed in claim 11, wherein said interaction between said avatar and said user comprises presenting, to said user, on the display of the computing device, one or more options to select from, wherein said one or more options are customized for said user.

14. The system as claimed in claim 11, wherein said avatar is accessed by a plurality of remote users that are remotely connected with said avatar through respective computing devices, wherein the user is a part of said plurality of users, wherein the plurality of remote users interact with the avatar simultaneously.

15. The system as claimed in claim 11, wherein the audio input is in the form of any or a combination of one or more sentences, phrases, words, music, song or any other verbal message or instructions from the user in one or more languages spoken by the user, wherein the avatar adapts and interacts with the user in the one or more of the user's spoken languages.

16. The system as claimed in claim 11, wherein the avatar interacts with the user by having an actual human-like conversation using audio and visual outputs, and behaves as a living entity by understanding the user's speech and gestures and responding to them using audio and visual outputs.

17. The system as claimed in claim 11, wherein the visual input comprises one or more of gestural input from the user, facial image of the user, and image of an object associated with the user, wherein the system further comprises a visual input processing module configured to identify, through the avatar, the object from the image of the object and interacting with the user relating to the identified object, wherein if the user is identified as the existing user, the avatar is customized on the basis of the facial image of the existing user, and wherein the avatar interacts with the existing user in the user's preferred language and format.

18. The system as claimed in claim 11, wherein based on the further audio or visual input comprising facial input or gestural input of the user, the avatar switches from a set of avatars present in system.

19. The system as claimed in claim 11, further comprising a visual processing module, an audio processing module and a cognitive engine, wherein the visual processing module is configured to identify commands from the visual input, the audio processing module is configured to identify commands from the audio input, and the cognitive engine is configured to correlate the audio output and the video output of the avatar with the identified commands.

20. The system as claimed in claim 11, wherein the system further comprise an authentication module configured to authenticate an identity of the user from one or more of the audio input and the visual input, taking user details through a conversational format and using the information to sign the user for one or more memberships or workflows.

* * * * *